(12) United States Patent
Tran et al.

(10) Patent No.: US 6,687,199 B1
(45) Date of Patent: Feb. 3, 2004

(54) AUTOMATED SERVO CONTROL SYSTEM

(75) Inventors: Paul Thanh Tran, Milpitas, CA (US); Wei Qian, Sunnyvale, CA (US)

(73) Assignee: Mosel Vitelic Corporation, San Jose, CA (US)

( * ) Notice: Subject to any disclaimer, the term of this patent is extended or adjusted under 35 U.S.C. 154(b) by 639 days.

(21) Appl. No.: 09/596,861

(22) Filed: Jun. 19, 2000

(51) Int. Cl.$^7$ .............................................. G11B 7/00
(52) U.S. Cl. ................................ 369/44.14; 369/59.21
(58) Field of Search ........................... 369/44.11, 44.14, 369/44.25, 44.26, 44.34, 47.31, 47.32, 47.33, 47.34, 47.35, 59.21, 59.27

(56) References Cited

U.S. PATENT DOCUMENTS

| | | | | |
|---|---|---|---|---|
| 4,937,440 A | * | 6/1990 | Hofer et al. | 369/44.11 |
| 5,089,757 A | * | 2/1992 | Wilson | 369/44.11 |
| 5,170,296 A | * | 12/1992 | Eiberger | 360/22 |
| 6,388,968 B1 | * | 5/2002 | Ohta et al. | 369/53.45 |
| 6,490,121 B1 | * | 12/2002 | Pruett et al. | 360/78.09 |

* cited by examiner

*Primary Examiner*—William Korzuch
*Assistant Examiner*—Bach Vuong
(74) *Attorney, Agent, or Firm*—Sawyer Law Group LLP

(57) ABSTRACT

The present invention provides a method and system for servo control in an optical drive. The method includes initiating an execution of a multiplier and accumulator controller (MAC) by a processor; and automatically calculating a transfer function by the MAC based upon a sample servo data. The present invention provides a servo control system which utilizes a MAC which is directly linked to the sample servo data. When a processor commands the MAC to execute, the MAC receives the sample servo directly from an Analog-to-Digital Converter (ADC); retrieves the corresponding accumulated sample servo data from a memory; calculates the transfer function; and stores the results back into the memory. The processor then accesses the memory to retrieve the result. Because the MAC is able to calculate the transfer function with minimal intervention from the processor, significant processing resources and time are saved.

10 Claims, 5 Drawing Sheets

AUTOMATED SERVO CONTROL SYSTEM

FIELD OF THE INVENTION

The present invention relates to optical drives, and more particularly to servo control in optical drives.

BACKGROUND OF THE INVENTION

The use of control systems in optical drive controllers for servo control, such as for Compact Disc (CD) and Digital Video Disc (DVD) drives, is well known in the art. FIG. 1 illustrates the general concept of a control system. The control system 100 includes a system 102 which has a particular input. The system's output is read, and a transfer function is computed. The transfer function indicates the amount of error in the system 102. Based upon the transfer function, a force is added to the input to modify the system's behavior. The output is read again. This process repeats until the transfer function indicates zero error in the system 102. One skill in the art understands that the transfer function for the control system 100 is a "multiply and accumulate" function. A general format of the transfer function is as follows:

$$H=\Sigma(a_1b_1)+\Sigma(a_2b_2),$$

Where $b_1$ is the input, $b_2$ is the accumulated output, and $a_1$ and $a_2$ are coefficients.

FIG. 2 illustrates a conventional servo control system in an optical drive controller. A digital servo control 202 typically controls the operation of the servo, via servo control processors 216, in reading and writing data from and to an optical disc (not shown). To monitor the servo, an analog sample servo data is periodically obtained and converted to a digital format by an Analog-to-Digital Converter 204 (ADC). Conventionally, the result is a 10-bit value for any channel that the ADC 204 samples and converts. Each result of the channels are then placed into one of eight registers 206. The processor 208 executes software instructions which reads the current contents of the registers 206; obtains the accumulated sample data from the memory 210, which were computed based upon past contents of the registers 206; and computes the transfer function. The resulting accumulated sample data is then stored back in the memory 210. Based upon the computed transfer function, a new force is applied to the servo via the servo control processors 216. This continues until the error in the servo system equals zero. However, the execution of the software instructions require significant processor resources and time.

Some conventional methods decrease the requirements on the processor 208 by utilizing a dedicated Multiplier and Accumulator Controller (MAC) 214 for the computation of the transfer function. However, the processor 208 still must execute software instructions for reading the contents of the registers 206; obtain the accumulated sample data from the memory 210; write the accumulated sample data into the MAC 214; instruct the MAC 214 to compute the transfer function; and store the results from the MAC 214 into the memory 210. Thus, significant processor resources and time is still required.

Accordingly, there exists a need for an improved servo control system for an optical drive controller. The improved system should decrease the required processor resources and time. The present invention addresses such a need.

SUMMARY OF THE INVENTION

The present invention provides a method and system for servo control in an optical drive. The method includes initiating an execution of a Multiplier and Accumulator Controller (MAC) by a processor; and automatically calculating a transfer function by the MAC based upon a sample servo data. The present invention provides a servo control system which utilizes a MAC which is directly linked to the sample servo data. When a processor commands the MAC to execute, the MAC receives the sample servo directly from an Analog-to-Digital Converter (ADC); retrieves the corresponding accumulated sample servo data from a memory; calculates the transfer function; and stores the results back into the memory. The processor then accesses the memory to retrieve the result. Because the MAC is able to calculate the transfer function with minimal intervention from the processor, significant processing resources and time are saved.

DETAILED DESCRIPTION

The present invention provides an improved servo control system for an optical drive controller. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a servo control system which utilizes a Multiplier and Accumulator Controller (MAC) which is directly linked to the sample servo data. When a processor commands the MAC to execute, the MAC receives the sample servo directly from the Analog-to-Digital Converter (ADC); retrieves the corresponding accumulated sample servo data from a memory; calculates the transfer function; and stores the results back into the memory, without processor intervention. The processor then accesses the memory to retrieve the result.

To more particularly describe the features of the present invention, please refer to FIGS. 3 through 5 in conjunction with the discussion below.

Figure 1:
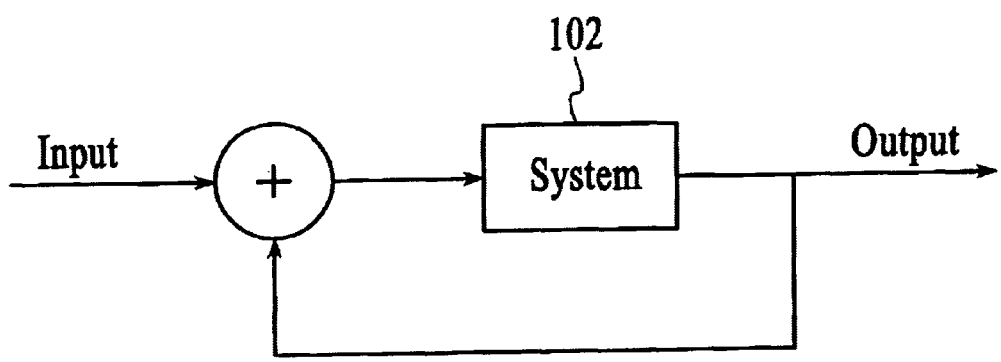
FIG. 1 illustrates the general concept of a control system.
Figure 2:
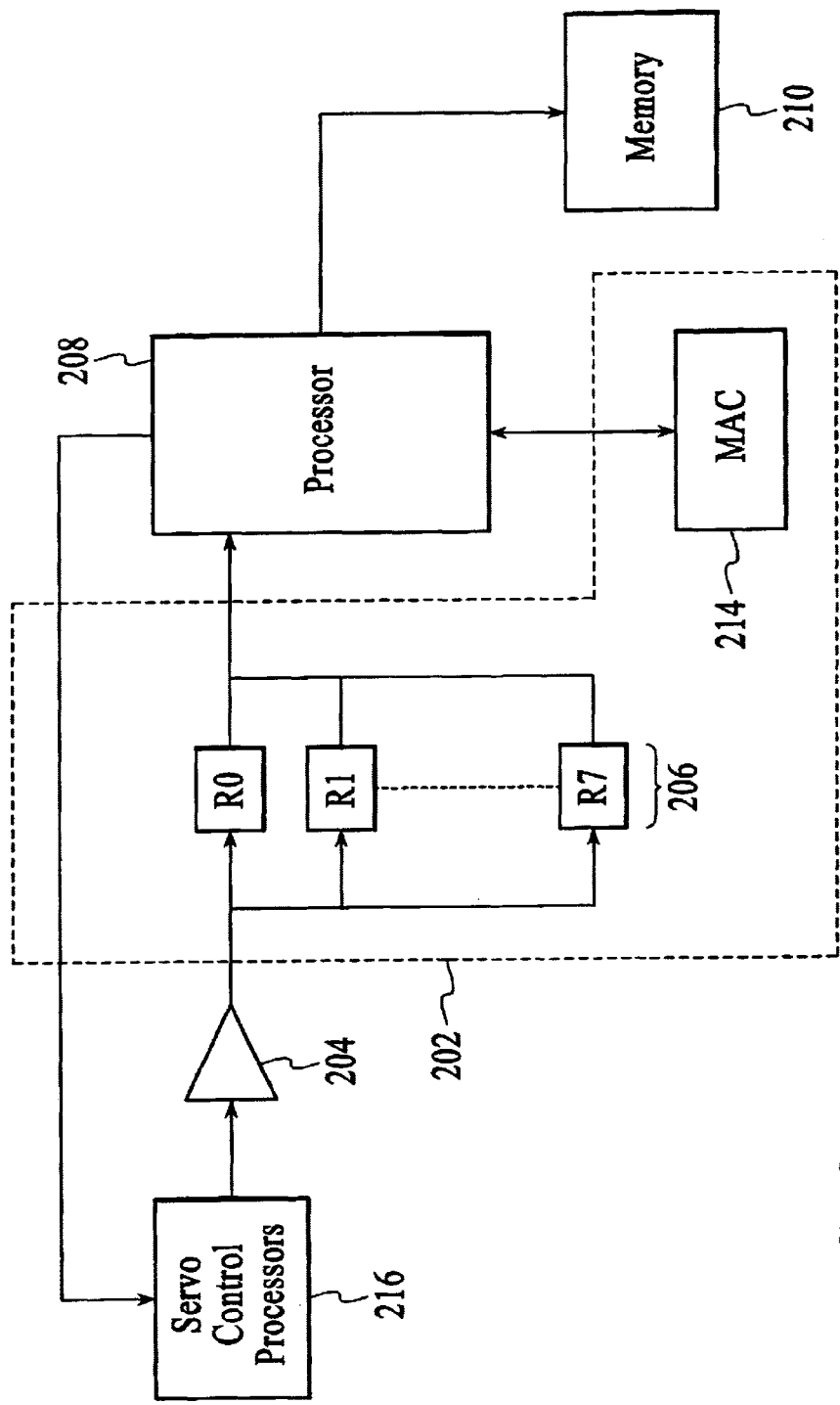
FIG. 2 illustrates a conventional servo control system in an optical drive controller.
Figure 3:
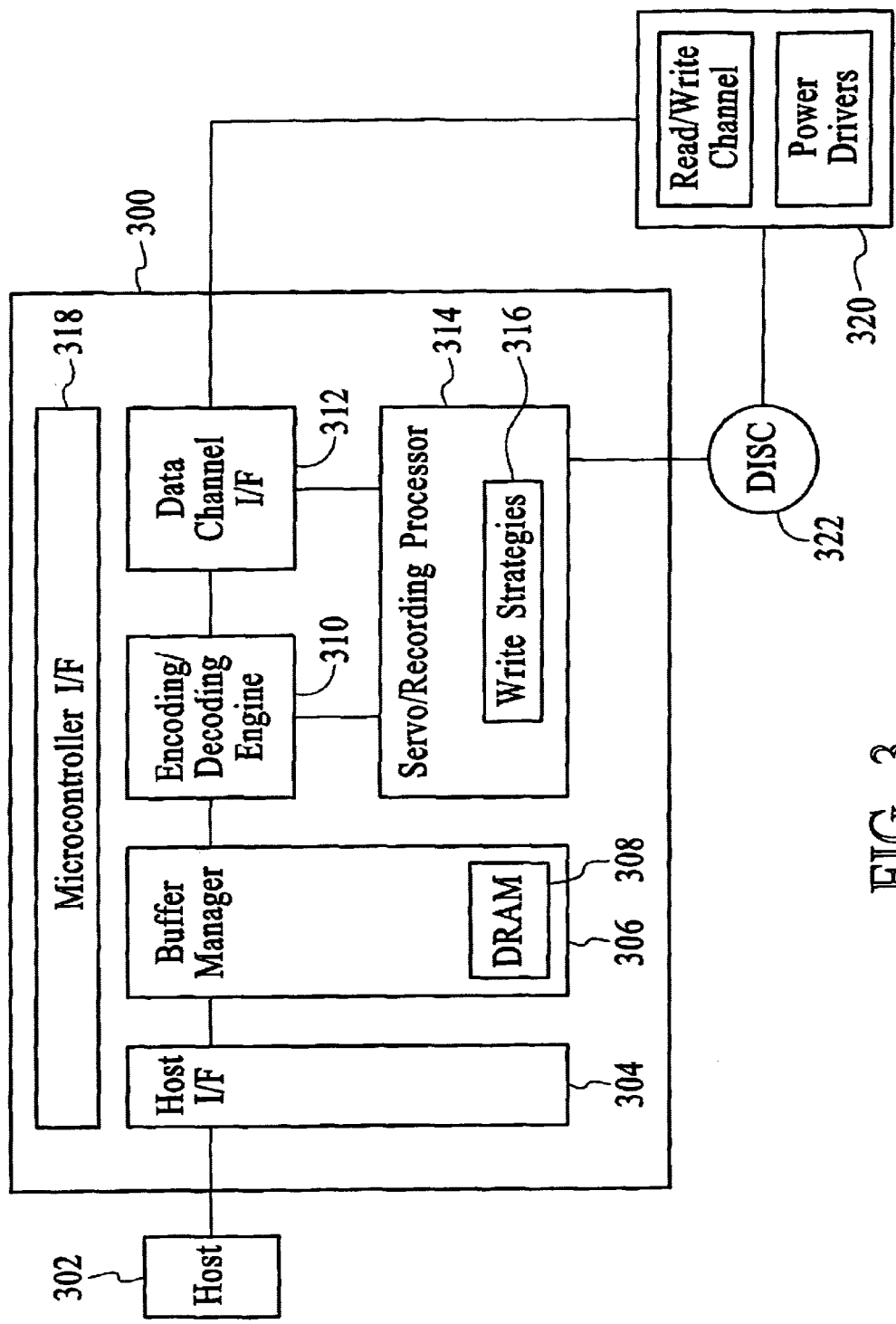
FIG. 3 is a block diagram illustrating a preferred embodiment of a controller which may use the method and system in accordance with the present invention.

FIG. 3 is a block diagram illustrating a preferred embodiment of a controller which may use the method and system in accordance with the present invention. The elements 304–318 represent the logical architecture of the controller 300. The controller 300 comprises a host interface 304, a buffer manager 306 with an embedded memory 308, an integrated encoding/decoding engine 310, a data channel interface 312, an integrated servo/recording processor 314 embedded with the write strategies 316, and a microcontroller interface 318. In the preferred embodiment, the embedded memory 308 is an embedded dynamic random access memory (DRAM). The integrated servo/recording processor 314 provides the mechanical control of the disc 320 and the spindle and sledge (not shown) of the drive for both reading and writing of data. The servo/recording processor 314 interfaces with the disc 322 in the writing of data. Integrated into the processor 314 are the write strategies 316 which controls the writing of the data so that they data is in a standard format. The write control logic in accordance with the present invention would be part of the servo/recording processor 314 for controller 300. The controller 300 is further described in co-pending U.S. patent application entitled "Integrated Controller To Process Both Optical Reads And Optical Writes Of Multiple Optical Media", Ser. No. 09/652,254, filed on Aug. 30, 2000. Applicant hereby incorporates this patent application by reference.

Figure 4:
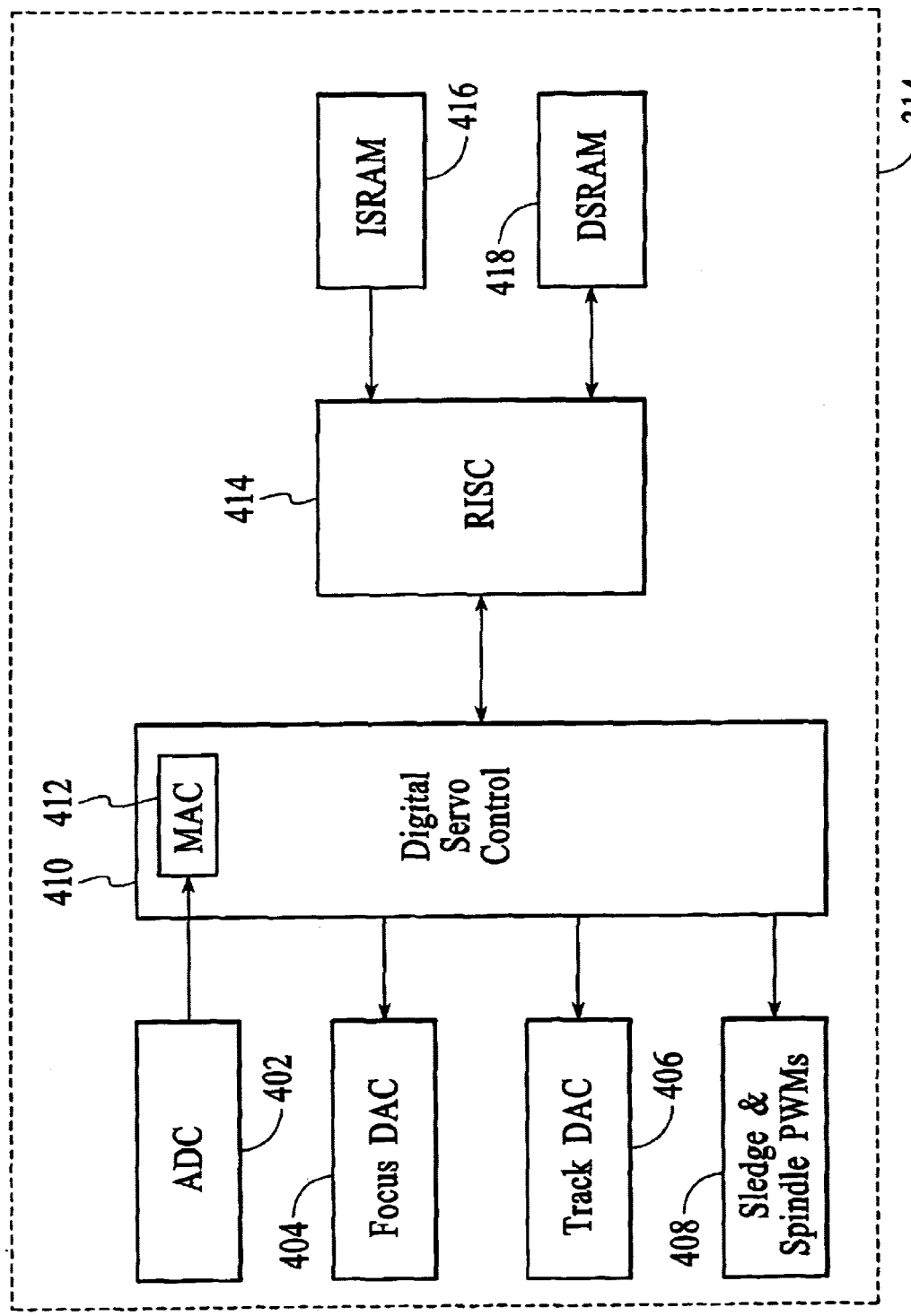
FIG. 4 illustrates a preferred embodiment of the servo/recording processor for the servo control system in accordance with the present invention.

FIG. 4 illustrates a preferred embodiment of the servo/recording processor 314 for the servo control system in accordance with the present invention. The servo/recording processor 314 comprises a Digital Servo Control 410 which includes a MAC 412. The MAC 412 receives the sample servo data via a direct link with the ADC 402. Because of the direct link, the MAC 412 is able to receive the sample servo data without intervention from the processor 414. In the preferred embodiment, the processor 414 is a Reduced Instruction Set Computer (RISC). The Digital Servo Control 410 also controls a focus Digital-to-Analog Converter (DAC) 404 which maintains the servo's laser beam (not shown) in the proper focus, a track DAC 406 which keeps the head of the servo (not shown) oriented on the proper track on the disc 322, and a sledge and spindle pulse width modulator (PWM) 408 which controls the sledge and spindle of the servo (not shown). The digital servo control 410 is in turn controlled by the RISC 414. The RISC 414 controls the digital servo control 410 by executing program instructions stored in the Instruction Static Random Access Memory (ISRAM) 416. The data SRAM 418 (DSRAM) is used by the RISC 414 as intermediate storage.

Figure 5:
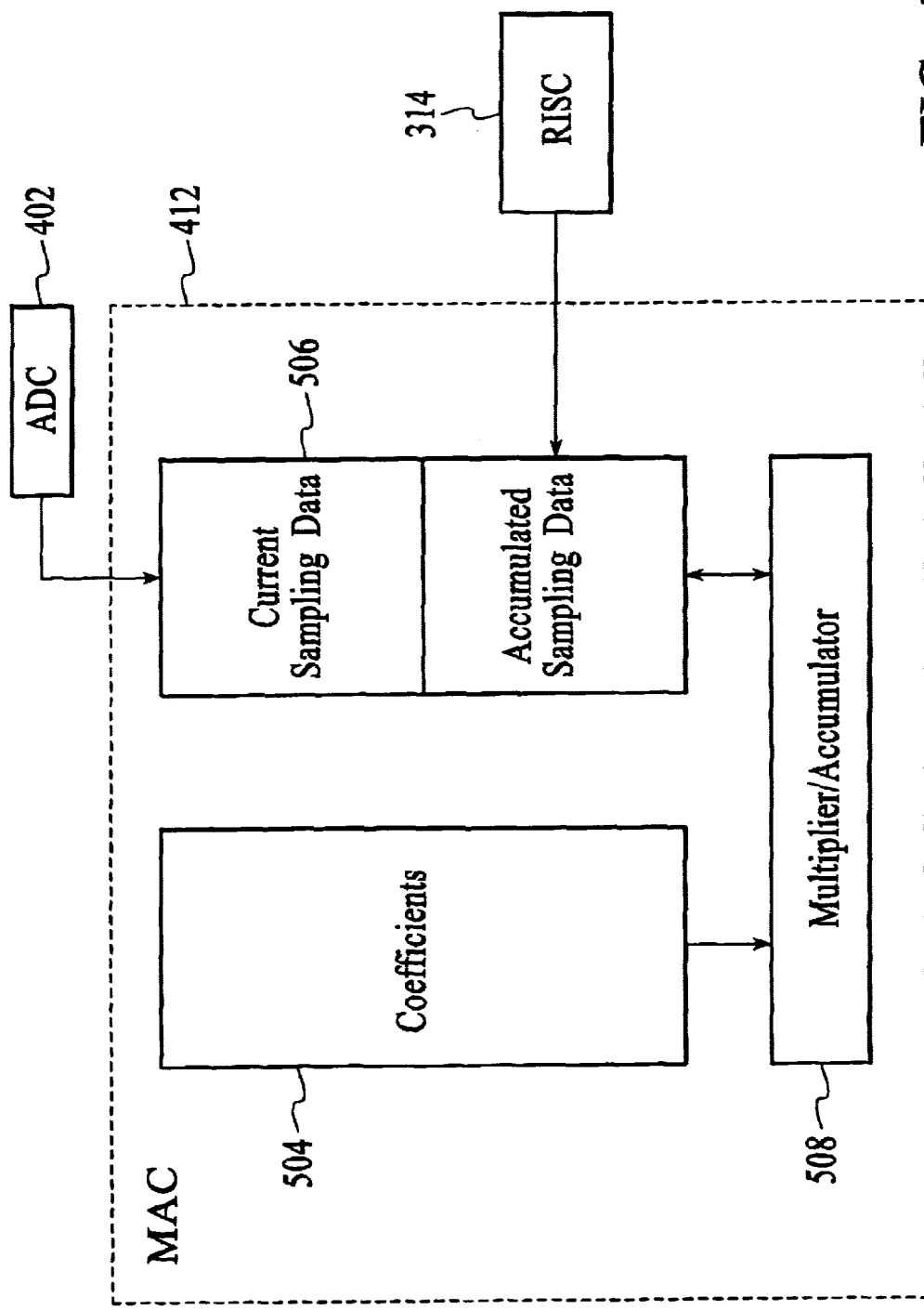
FIG. 5 illustrates a preferred embodiment of the media access controller (MAC) for the servo control system in accordance with the present invention.

FIG. 5 illustrates a preferred embodiment of the MAC 412 for the servo control system in accordance with the present invention. The MAC 412 comprises two Static Random Access Memories (SRAMs) 504 and 506. SRAM 504 stores the coefficients of the transfer function. The coefficients were loaded into the SRAM 504 by the RISC 414 when the MAC 412 was initialized. The SRAM 506 stores the current sample servo data and the accumulated sample servo data.

The RISC 314 starts the execution of the MAC 412. The MAC 412 automatically performs the following without further intervention from the RISC 314:

The MAC automatically retrieves the sample servo data from the ADC 402. The ADC 402 loads the sample servo data into SRAM 506. Also stored in SRAM 506 is the accumulated sample servo data. The MAC 412 then loads the current sample servo data, the accumulated sample servo data, and the coefficients into a multiplier and accumulator 508. The multiplier/accumulator 508 performs the multiplication and accumulation tasks required to calculate the transfer function. The result is stored back into SRAM 506 as the updated accumulated sample servo data. The MAC 412 then notifies the RISC 314 that the updated accumulated sample servo data is available. The RISC 314 accesses the SRAM 506 and retrieves the updated accumulated sample servo data. Since the RISC 314 is not required to intervene during the execution of the MAC 412, the RISC 314 is available to perform other functions.

Although the present invention is described in the context of the controller 300, one of ordinary skill in the art will understand that other controllers may utilize the method and system in accordance with the present invention without departing from the spirit and scope of the present invention.

An improved servo control system for an optical drive controller has been disclosed. The present invention provides a servo control system which utilizes a MAC which is directly linked to the sample servo data. When a processor commands the MAC to execute, the MAC receives the sample servo directly from the ADC; retrieves the corresponding accumulated sample servo data from a memory; calculates the transfer function; and stores the results back into the memory. The processor then accesses the memory to retrieve the result. Because the MAC is able to calculate the transfer function with minimal intervention from the processor, significant processing resources and time are saved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for servo control in an optical drive, comprising:
   a processor for initiating a MAC; and
   the MAC for automatically calculating a transfer function based upon a sample servo data, wherein the MAC comprises:
      a first memory for storing a set of coefficients for the transfer function;
      a second memory coupled to an Analog-to-Digital Converter (ADC) for storing the sample servo data and an accumulated sample servo data; and
      a multiplier/accumulator coupled to the first and second memories for calculating the transfer function based upon the set of coefficients, the sample servo data, and the accumulated sample servo data.

2. The system of claim 1, wherein a result of the calculation performed by the multiplier/accumulator is an updated accumulated sample servo data, wherein the updated accumulated sample servo data is stored in the second memory.

3. The system of claim 2, wherein the processor is capable of accessing the second memory to retrieve the updated accumulated sample servo data.

4. A system for servo control in an optical drive, comprising:
   an ADC for obtaining a sample servo data;
   a digital servo control, wherein the digital servo control comprises a MAC coupled to the ADC, wherein the MAC is capable of automatically calculating a transfer function after an execution of the MAC is initiated; and
   a processor coupled to the digital servo control for initiating the execution of the MAC/wherein the MAC comprises:
      a first memory for storing a set of coefficients for the transfer function;
      a second memory coupled to the ADC for storing the sample servo data and an accumulated sample servo data; and
      a multiplier/accumulator coupled to the first and second memories for calculating the transfer function based upon the set of coefficients, the sample servo data, and the accumulated sample servo data.

5. The system of claim 4, wherein a result of the calculation performed by the multiplier/accumulator is an updated accumulated sample servo data, wherein the updated accumulated sample servo data is stored in the second memory.

6. The system of claim 5, wherein the processor is capable of accessing the second memory to retrieve the updated accumulated sample servo data.

7. A system for servo control in an optical drive, comprising:
- an ADC for obtaining a sample servo data;
- a digital servo control, wherein the digital servo control comprises a MAC coupled to the ADC, wherein the MAC is capable of automatically calculating a transfer function after an execution of the MAC is initiated, wherein the MAC comprises:
  - a first memory for storing a set of coefficients for the transfer function,
  - a second memory coupled to the ADC for storing the sample servo data and an accumulated sample servo data, and
  - a multiplier/accumulator coupled to the first and second memories for calculating the transfer function based upon the set of coefficients, the sample servo data, and the accumulated sample servo data; and
- a processor coupled to the digital servo control for initiating the execution of the MAC.

8. The system of claim 7, wherein a result of the calculation performed by the multiplier/accumulator is an updated accumulated sample servo data, wherein the updated accumulated sample servo data is stored in the second memory.

9. The system of claim 8, wherein the processor is capable of accessing the second memory to retrieve the updated accumulated sample servo data.

10. An optical drive, comprising:
- a servo; and
- a controller coupled to the servo, the controller comprising:
  - an ADC for obtaining a sample servo data;
  - a digital servo control, wherein the digital servo control comprises a MAC coupled to the ADC, wherein the MAC is capable of automatically calculating a transfer function after an execution of the MAC is initiated, wherein the MAC comprises:
    - a first memory for storing a set of coefficients for the transfer function,
    - a second memory coupled to the ADC for storing the sample servo data and an accumulated sample servo data, and
  - a multiplier/accumulator coupled to the first and second memories for calculating the transfer function based upon the set of coefficients, the sample servo data, and the accumulated sample servo data; and
  - a processor coupled to the digital servo control for initiating the execution of the MAC.

* * * * *